Figure 1:
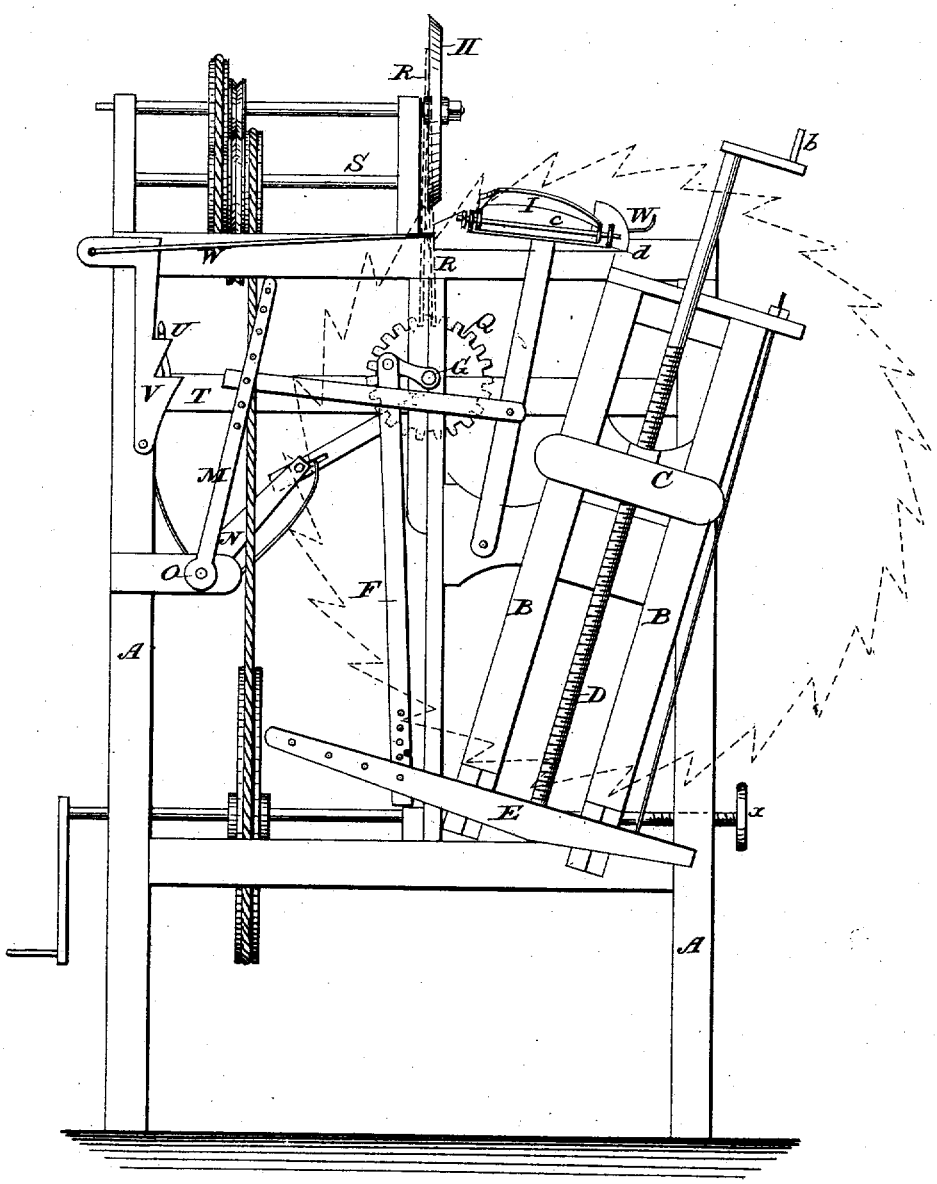

2 Sheets—Sheet 1.

W. L. COVEL,

Assignor to W. H. HALLADAY, C. LITCHFIELD, and E. BENJAMIN.

SAW SHARPENING MACHINE.

No. 10,252. Reissued Dec. 5, 1882.

*Witnesses:*

James Thompson.

D. F. Kelcher.

*Inventor:*

William L. Covel,

By T. C. Brecht

Attorney.

N. PETERS, Photo-Lithographer, Washington, D. C.

2 Sheets—Sheet 2.
W. L. COVEL,
Assignor to W. H. HALLADAY, C. LITCHFIELD, and E. BENJAMIN.
SAW SHARPENING MACHINE.
No. 10,252. *Fig. 2.* Reissued Dec. 5, 1882.
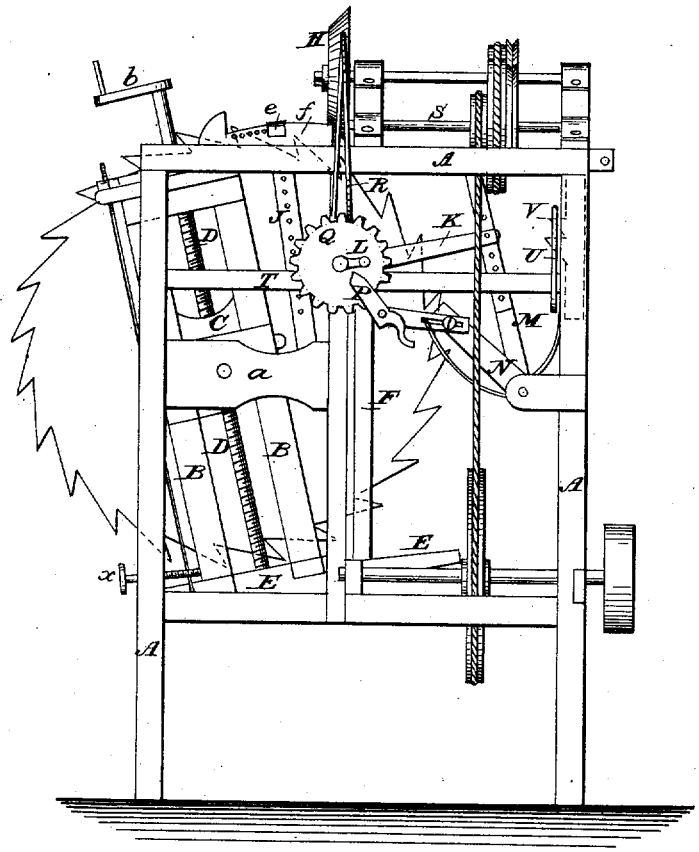
*Fig. 3.*
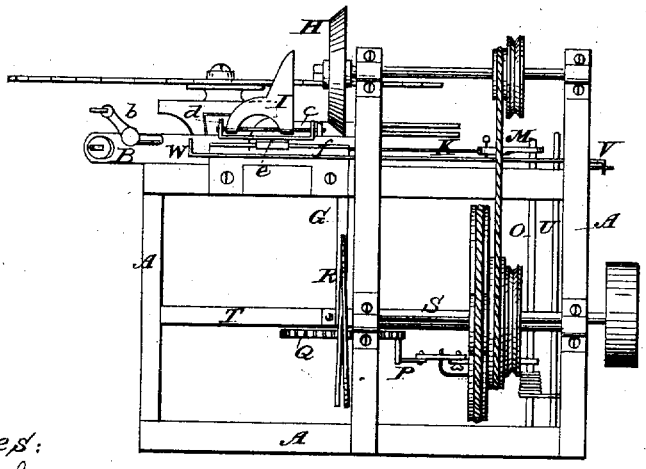
*Witnesses:*
James Thompson
S. F. Kelcher.
*Inventor:*
William L. Covel,
By T. C. Brecht,
Attorney.
N. PETERS, Photo-Lithographer, Washington, D. C.

UNITED STATES PATENT OFFICE.

WILLIAM L. COVEL, OF STEVENS' POINT, WISCONSIN, ASSIGNOR TO WILLIAM H. HALLADAY, CLINTON LITCHFIELD, AND EDWIN BENJAMIN, OF CHICAGO, ILLINOIS.

SAW-SHARPENING MACHINE.

SPECIFICATION forming part of Reissued Letters Patent No. 10,252, dated December 5, 1882.

Original No. 172,092, dated January 11, 1876. Application for reissue filed October 30, 1882.

*To all whom it may concern:*

Be it known that I, WILLIAM L. COVEL, of Stevens Point, in the county of Portage and State of Wisconsin, have invented certain new and useful Improvements in Saw-Sharpening Machines; and I do hereby declare the following is a full, clear, and exact description of the invention, that will enable others skilled in the art to which it appertains to make and use the same, reference being had to the accompanying drawings, and to the letters of reference marked thereon, which form a part of this specification.

In the accompanying drawings, Figure 1 is a vertical front elevation with the saw-plate removed. Fig. 2 is a vertical rear elevation. Fig. 3 is a plan view.

The object of this invention is to provide a machine for sharpening saws, which, after being once adjusted, shall automatically sharpen all of the teeth of the saw without further attention, and be made to stop operating upon or cease to sharpen the saw at any desired point.

The invention consists in an adjustable frame pivoted in the center, and having parallel guideways, in which moves a sliding block to which the saw is detachably fastened. Through said sliding block passes a screw-threaded rod, whereby the block and saw may be adjusted in the frame, and to the lower end of this rod is attached a lever connected through a pitman with the crank of a slowly-revolving shaft, by means of which the saw and block are together elevated and made to approach a revolving emery-wheel each time a tooth is sharpened. At the top of the main frame is a pivoted latch-feed controlled by a guide, which latch-feed moves the saw by engaging with the face of the saw-teeth for the purpose of bringing the teeth successively in position for the emery-wheel. The said feed is fastened to the top of a lever, and is actuated through a pitman and rock-shaft with double cranks and a tappet by a crank upon the slowly-revolving shaft before mentioned. This shaft is journaled in a movable bar supported at one end by a lever, which lever is provided with a tripping device for throwing the pinion of the shaft out of gear to stop the motion of the feeding devices.

In the drawings, A represents the main frame of the machine, to which is pivoted at *a* the adjustable frame B. Said frame B is provided with parallel guideways, in which moves a sliding block, C, to which the saw is attached. Through said sliding block passes a screw-threaded rod, D, having at the top a crank, *b*, by means of which the position of the block in the frame may be changed and different-sized saws adjusted to the sharpening-wheel. The lower end of the rod D is attached to a lever, E, which is elevated and depressed alternately through an adjustable pitman, F, attached to the crank of a slowly-revolving shaft, G, for the purpose of raising the block C and the saw attached thereto, so as to bring the teeth in contact with the emery-wheel H.

I is a pivoted latch-feed, which moves with a reciprocating motion, and by bearing against the face of the saw-teeth feeds the saw to the grinding-wheel—one tooth at each movement. Said latch-feed is pivoted upon a horizontal screw-threaded bolt, *c*, in the head *d*, which gives it an adjustment in said head, and is provided with a slide, *e*, moving over guide *f*, the latter being provided with holes for a stop-pin to determine the throw of the latch and head. The said head carrying the latch is attached to the upper end of a lever, J, which is reciprocated by the pitman K, which latter is operated by a crank, L, upon the shaft G through cranks M and N, the rock-shaft O, and the adjustable tappet P. The connections of the pitman with the lever J and crank M are made adjustable, as is also the connection of the tappet with the crank N, the object of said adjustments being to qualify and regulate the feed according to the particular requirements of the case. The end of said tappet is made reversible, being pivoted in the middle upon a binding-screw, and having one end straight and the other curved to correspond to the particular shape of the tooth.

Q is a pinion upon the shaft G, which gears with and is slowly revolved by a worm-wheel, R. Said wheel is attached to the same shaft, S, with the driving-pulley, which shaft is geared with and actuates the shaft of the grinding emery-wheel.

T is a movable bar, in which is journaled the shaft G, carrying the pinion, one end of which bar is supported in a lever, U, which may be raised or lowered, so as to throw the said pinion out of gear with the worm-wheel and stop the feeding devices.

V is a tripping device, having projections upon which the end of the lever U rests; and W is a rod attached to said device, which is arranged to be struck by a clamp attached to the saw-plate at any given time, so as to discontinue the operation of sharpening at any given point.

The operation of the machine is as follows: The saw is first fastened to the block and the frame B adjusted upon its pivot at *a* to the emery-wheel, according to the size of the saw, through a binding-screw, *x*, and the block then adjusted in said frame by the screw-threaded rod passing therethrough. Motion being now imparted to the shaft G, the crank of the latter lifts pitman F, lever E, and with it the rod D, block, and saw, bringing the teeth of the latter into position beneath the grinding-wheel. As the saw descends the crank L of the shaft G strikes the tappet, and, moving the rock-shaft, pitman, and feed-lever, carries the latch-wheel against the face of the saw-teeth and rotates the saw the distance of one tooth, the latch-feed being carried back into position for the next movement either by the weight of the feeding devices or a spring. The operation of sharpening the saw is thus rendered automatic, and if the workmen be called away during the operation a clamp may be affixed to the saw-plate at the finishing-point, which clamp will, when it passes around, strike the rod W, and by throwing the working parts out of gear stop operation at the proper point.

The machine as thus described is equally as well adapted for straight as for circular saws. When circular saws are to be operated upon, the saw is pivoted to an attachment to the sliding block, and when straight saws are sharpened they are mounted upon a carriage attached to said block, the mode of feeding and sharpening being the same in both cases.

Having thus described my invention, what I claim as new is—

1. In saw-sharpening machines, the adjustable hangers, in combination with adjustable feed mechanism, substantially as set forth.

2. In saw-sharpening machines, the combination of the adjustable saw-hanger with an emery-wheel, arranged substantially as specified.

3. In saw-sharpening machines, adjustable hangers operated by levers to present the saw to an emery-wheel, substantially as set forth.

4. In saw-sharpening machines, an automatic latch-feed acting against each tooth in succession, substantially as and for the purpose described.

5. In saw-sharpening machines, the combination of adjustable hanger with an automatic latch-feed mechanism, substantially as set forth.

6. In saw-sharpening machines, the combination of adjustable saw-hanger and adjustable feed mechanism with an emery-wheel, substantially as and for the purpose described.

7. An automatic saw-sharpening machine having adjustable saw-hanger, adjustable feed mechanism, and an emery-wheel, substantially as specified.

8. In saw-sharpeners, an adjustable tappet adapted to regulate the feed and give the desired shape to the back of the saw-teeth, substantially as set forth.

9. The combination, with the latch-feed, of a pivoted lever, adjustable pitman, rock-shaft, and mechanism for imparting an intermittent motion to an adjustable tappet to regulate the feed, substantially as specified.

10. In saw-sharpening machines, a pivoted latch-feed having a finger which bears against the saw-teeth in succession, substantially as set forth.

11. The combination of a latch mechanism, I, having a projecting finger which engages with the saw-teeth in succession, and adapted to be adjusted by a screw-threaded bolt, *c*, in a head, *d*, and means for determining the throw of the latch and head, all substantially as specified.

12. The combination of a latch-feed, I, a screw-threaded pivoted bolt, *c*, and a suitable guide and stop, as shown and for the purpose described.

13. The combination of a sliding block, a screw-rod, D, lever E, pitman F, and crank-shaft G, as and for the purpose set forth.

14. The combination, with a latch-feed, of a pivoted lever, J, pitman K, rock-shaft O, cranks M N, tappet P, and crank L, as and for the purpose described.

15. The combination, with a pinion, Q, and a worm-wheel, of a movable bar, T, lever U, tripping device V, and rod W, substantially as and for the purpose described.

In testimony whereof I affix my signature in presence of two witnesses.

W. L. COVEL.

Witnesses:
W. W. MITCHELL,
PITER NILAN.